(12) United States Patent
McClain et al.

(10) Patent No.: US 7,043,555 B1
(45) Date of Patent: May 9, 2006

(54) TECHNIQUES FOR CONTENT FILTERING

(75) Inventors: Carolyn B. McClain, Springville, UT (US); Stephen R. Carter, Spanish Fork, UT (US); Kevin Rhodes, Lehi, UT (US); Mark D. Ackerman, Eagle Mountain, UT (US); Carl B. Andersen, Orem, UT (US); Vernon Roger Holm, Sandy, UT (US); Stuart Jensen, Orem, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 10/880,760

(22) Filed: Jun. 30, 2004

Related U.S. Application Data

(63) Continuation-in-part of application No. 09/560,307, filed on Apr. 27, 2000, now Pat. No. 6,772,214.

(51) Int. Cl.
*G06F 15/16* (2006.01)
*G06F 3/00* (2006.01)
*H04N 7/16* (2006.01)

(52) U.S. Cl. .................... 709/229; 719/328; 725/28
(58) Field of Classification Search ............... 709/229; 719/313, 328; 725/28
See application file for complete search history.

(56) References Cited

U.S. PATENT DOCUMENTS

| | | | |
|---|---|---|---|
| 5,678,041 A | 10/1997 | Baker et al. ............... 395/609 |
| 5,826,014 A | 10/1998 | Coley et al. ........... 395/187.01 |
| 5,878,233 A | 3/1999 | Schloss ................. 395/200.55 |
| 5,884,025 A | 3/1999 | Baehr et al. ........... 395/187.01 |
| 5,913,025 A | 6/1999 | Higley et al. .......... 395/187.01 |
| 5,991,810 A | 11/1999 | Shapiro et al. ............. 709/229 |
| 6,081,900 A | 6/2000 | Subramaniam et al. ..... 713/201 |
| 6,112,228 A | 8/2000 | Earl et al. ................... 709/205 |
| 6,122,666 A | 9/2000 | Beurket et al. ............. 709/226 |
| 6,151,584 A * | 11/2000 | Papierniak et al. ........... 705/10 |
| 6,151,601 A | 11/2000 | Papierniak et al. ........... 707/10 |
| 6,438,579 B1 * | 8/2002 | Hosken ....................... 709/203 |
| 6,493,744 B1 * | 12/2002 | Emens et al. ............... 709/203 |
| 6,510,458 B1 | 1/2003 | Berstis et al. ............... 709/219 |
| 6,513,061 B1 | 1/2003 | Ebata et al. ................ 709/203 |
| 6,529,526 B1 * | 3/2003 | Schneidewend ............ 370/486 |
| 2002/0035573 A1 * | 3/2002 | Black et al. ............. 707/104.1 |
| 2003/0203732 A1 * | 10/2003 | Eerola ...................... 455/422.1 |
| 2004/0107177 A1 * | 6/2004 | Covill et al. ................... 707/1 |

* cited by examiner

*Primary Examiner*—David Wiley
*Assistant Examiner*—Michael Delgado
(74) *Attorney, Agent, or Firm*—Schwegman, Lundberg, Woessner & Kluth P.A.

(57) ABSTRACT

Techniques are provided for content filtering. Logic expressions are evaluated to filter content in response to content ratings. The logic expressions include operators that are overloaded and associated with content operators for specific content providers or specific rating systems. By evaluating the logic expressions with the content operators, one or more actions can be automatically and dynamically performed.

31 Claims, 4 Drawing Sheets

TECHNIQUES FOR CONTENT FILTERING

RELATED APPLICATION

The present invention is a Continuation-In Part of, claims priority to, and is with U.S. Ser. No. 09/560,307 entitled "System and Method for Filtering Web-Based Content Stored on A Proxy Cache," filed on Apr. 27, 2000 U.S. Pat. No. 6,772,214; the disclosure of which is incorporated by reference herein.

FIELD OF THE INVENTION

The invention relates generally to data processing and in particular to content filtering.

BACKGROUND OF THE INVENTION

Filtering content has become a vital operation performed within virtually every organization and household that is connected to the Internet. The reasons for content filtering vary. Some reasons to filter content include blocking content associated with viruses, adult material (e.g., violence, pornography, etc.), and nuisance information (e.g., advertisements, etc.). Other reasons include restricting access to confidential material, etc.

By and large, organizations use a combination of automated services and manual techniques to filter content. Automated services may inspect links to certain services and provide pre-assigned ratings to content included therein or inspect the content itself and provide a rating. Manual techniques may include maintaining lists of words, phrases, and links that are used to determine if access to certain content is to be blocked or restricted.

One problem with content filtering is that within large organizations maintaining automated services and manual techniques for a plurality of resources, which may each have different access privileges, can quickly become a daunting exercise. Content ratings are continuously changing and new content is continuously received. In addition, access privileges of resources are regularly modified and new resources are added while others are deleted.

Conventional content filtering approaches do not provide a single generic approach that is re-usable and flexible enough to dynamically handle the changing environment associated with content filtering. This is so, because the tools and techniques do not exist for an organization to generically define and manage its own content filtering needs in manners that are uniquely needed by that organization and in manners that can be automatically and dynamically enforced.

Therefore, there is a need for improved content filtering.

SUMMARY OF THE INVENTION

In various embodiments of the invention, techniques are presented for content filtering. Content is filtered by evaluating ratings dynamically acquired and expressed within logic expressions. The logic expressions include operators that are overloaded and uniquely selected based on identities associated with content providers or ratings vendors. The overloaded operators return true or false statements when the logic expressions are evaluated and result in selective content filtering actions being processed. In some embodiments, ratings are aggregated together to form trends, evaluate thresholds, evaluate deviations, and the like.

More specifically, and in an embodiment, a method for content filtering is presented. A first operand of a logic expression is identified as a content rating associated with content of a content provider. A second operand of the logic expression is also identified. Next, an operator of the logic expression is mapped to a content operator based on the content provider. Furthermore, the logic expression is evaluated for performing one or more actions that filter the content based on values for the first operand, the second operand and in response to applying the content operator.

DETAILED DESCRIPTION OF THE INVENTION

Figure 1:
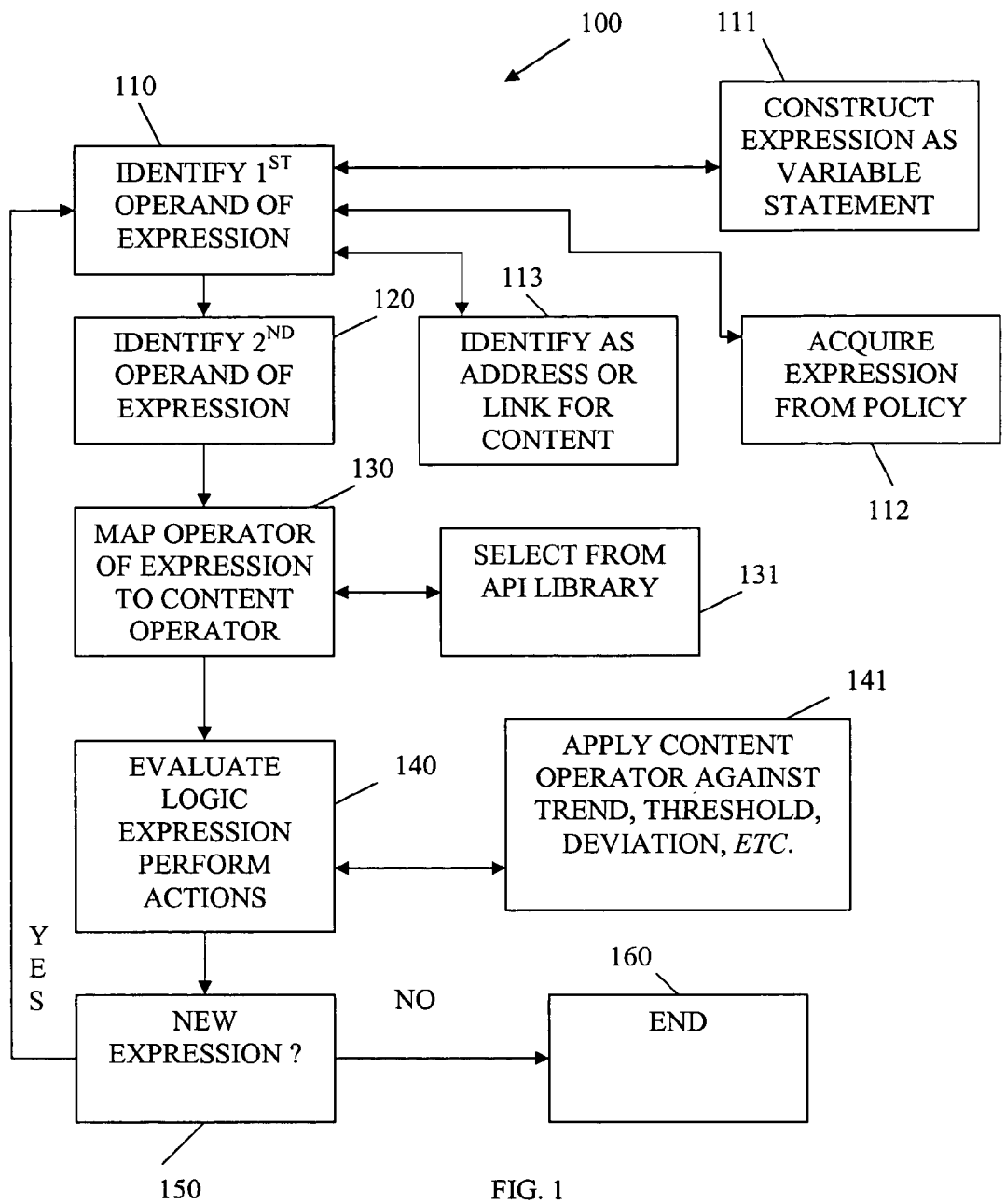
FIG. 1 is a flowchart of a method for content filtering, according to an example embodiment of the invention.

In various embodiments of the invention, the term "content" is used. Content refers to text, video, audio, image, graphics, or various combinations of the same, which are available in electronic format and distributed by content providers over a network. The content is consumed by resources (e.g., applications, systems, devices, peripherals, end-users, etc.). Some of this content may be harmful, may be confidential, and/or may be offensive. In other cases, a trend of content consumption by a resource or a group of resources may be monitored, such that at some point it is deemed unacceptable. The trend may be represented as a sum of ratings for content consumed, an average rating, a standard deviation for a rating, a threshold for ratings, etc. Therefore, organizations and individuals may desire to monitor, filter, and control certain content that is deemed unacceptable to them and their resources.

Content filtering refers to the act of inspecting and determining whether certain content is acceptable or unacceptable for consumption by a particular resource or group of resources. Thus, content is filtered even if it is permissibly provided to a resource, since before the content was delivered to the resource it was inspected and a determination was made that it could be permissibly provided to the resource.

A content rating is an objective and/or subjective categorization of a piece of content. Content ratings may be automatically assigned to content or manually assigned to content. Moreover, in some embodiments, external services referred to as ratings vendors supply ratings for content distributed by content providers. In some instances, a content provider may also be its own ratings vendor. In other instances, a ratings vendor is separate and independent from any particular content vendor. In one embodiment, a rating can be dynamically determined by inspecting content for pre-defined words, links (e.g., Uniform Resource Locators (URLs), Universal Resource Identifiers (URIs), etc.), images, audio, etc. A determination as to what rating to assign based on the presence of these pre-defined items can be based on custom algorithms (e.g., item frequency, item patterns, etc.). Moreover, a rating can be associated with industry standards or custom defined. Thus, a rating can be a hierarchical value, a numeric value, an alphabetic value, a word, a grade, or combinations of the same.

A logic expression is a statement that can be interpreted or compiled and processed by another application or service in order to evaluate the logic expression. A single logic expression includes a first operand, a second operand, and an operator. Both the first and second operands can themselves be nested logic expressions. The operator compares the first operand to the second operand. Operators are traditionally type specific meaning that a numeric operator is used with first and second numeric operands; a string operator is used with first and second string operands, etc.

In various embodiments of the invention, the operators of the logic expressions are overloaded meaning that numeric, string, set, table, database, list, queue, stack, tree, and other data structure operators may be used within the logic expressions for purposes of evaluating first operands that are associated with content ratings against second operands. This novel operator overloading technique permits generic logic expressions to generically represent and define content filtering in custom-defined manners, as will be presented herein and below.

In one embodiment, the techniques presented herein are incorporated into network arrangements and products, such as products that may perform data acceleration, caching, or filtering These techniques permit content filtering to be generically defined and dynamically processed in the manners set forth below.

FIG. 1 is a flowchart to a method 100 for content filtering, according to an example embodiment of the invention. The method 100 (herein after "processing") is implemented in a machine-accessible or readable medium and is accessible and processed over a network. In one embodiment, the processing is implemented and processed within a proxy service of a network configuration, such that it manages content being received by clients associated with the proxy. The content may be optionally cached within that proxy.

The processing filters content on behalf of resources. A resource is a client, a processing device, a peripheral, a data store, an application, a service, or a system that interfaces to the processing over a network. The resource makes requests for content and that content is controlled and delivered by content providers, which are external to the resource's local networking environment. In one embodiment, the resource is a World-Wide Web (WWW) browser that makes requests for content by accessing a URL or URI associated with a content provider. This request is intercepted or forwarded to the processing before the desired content is delivered to the requesting resource.

The processing interfaces with a number of other services, applications, and content providers for purposes of dynamically acquiring ratings for content. The ratings acquired are dynamically populated or associated as a first operand of a logic expression. In some embodiments, the first operand is represented as URL or URI for content, where part of that URL or URI identifies the content provider supplying the desired content. In this manner, the first operand can be dynamically acquired from a resource that attempts to access a URL or URI within a WWW browser and from this URL or URI the identity of the content provider can be acquired.

The logic expression includes a first operand, an operator, and a second operand. The second operand can be any constant or variable string or nested logic expression which is being compared to the first operand via the operator. The operator can be a numeric, string, set, tree, list, queue, table, database, stack, or other data structure operator. The operator would typically require that the first operand and second operand be compatible with the type of the operator (e.g., numeric, set, string, etc.). However, with embodiments of this invention, the types and values associated with the ratings of content of the first operand include content operators which provide functions to perform numeric, string, set, tree, list, queue, table database, stack, and/or other data structure comparisons against the second operand.

The content operators overload traditional operators whose traditional syntax appears in the logic expression. This permits analysts, programmers, administrators, or individual end-users to write or develop logic expressions in manners and syntaxes that they are use to, readily recognize, and understand. The actual function of the overloaded operator is dynamically acquired by the processing while evaluating the logic expressions for purposes of performing content filtering. The logic expressions themselves generically define one or more aspects of the content filtering.

As one example of a logic expression utilizing traditional operators and content ratings to perform content filtering consider the following logic expression: "If www.some-content-provider.com/content includes violence or adult material then exclude." Here the operator "includes" is traditionally associated with string, list, or set operations, such that the first operand www.some-content-provider.com/content and the second operand "violence or adult material" would need to traditionally be a string, list, or set. In the present invention, the first operand is resolved by dynamically acquiring a single rating or a list of ratings associated with the "content" and the operator "includes" is overloaded by acquiring from an Application Programming Interface (API) library software functions that know that the "includes" operator compares two strings and the strings have certain enumerated values (e.g., violence, adult material, acceptable, etc.). The proper software function defining the overloaded operator "includes" may be resolved based on an identity of the content provider "www.some-content-provider.com" or based on a ratings vendor that provides ratings for the content provider. The following example was presented for purposes of illustration only and is not intended to limit various aspects of the present invention.

With the context, FIG. 1 and the processing are now described. Accordingly, at 110 a first operand of a logic expression is identified. One technique for identifying the first operand is to parse the logic expression beginning at the left and continuing rightward until a known operator or reserved word or expression is acquired. Of course a variety of well known parsing techniques can be used to identify the components of the logic expression, and some of these techniques may be recursive such that any single operand may itself be a nested logic expression. All such parsing techniques are intended to fall within the scope of this invention.

Moreover, in some embodiments at 111, the logic expression may be constructed as a variable statement, such that each of its components (e.g., operands) is defined via variables that are resolved at runtime when the logic expression is being evaluated by the processing. In other embodiments, at 112, the logic expression is acquired from a policy and the policy is identified based on an identity for a resource that is requesting some content or based on a category associated with the content.

In one embodiment, at 113, the first operand is represented and identified as an address or link (e.g., URL, URI, etc.) for desired content, where the address or link is activated by a resource. The processing interprets the address or link as a request to acquire one or more ratings for a content provider that distributes the desired content and other content. In response to this address or link, the processing contacts a ratings vendor associated with the content provider or provides the content directly to a ratings vendor for purposes of acquiring a rating. In other embodiments, the rating is acquired by acquiring the content and dynamically evaluating the contents for information which provides the processing with a rating. The dynamically resolved rating or list of ratings replaces the original address or link when the logic expression is eventually evaluated.

At 120, the second operand is identified from the logic expression. The second operand may include constant or variable strings or nested logic expressions. In one embodiment, the second operand is another URL or URI to another ratings vendor for a specific type of content. Thus, if a developer does not want to hardcode a value for the second operand and knows that a particular value for a rating is defined for a known piece of content by a known ratings vendor, this can be coded as a URL for that known content in the second operand. The second operand is compared to the first operand via the operator.

At 130, the operator included in the logic expression is identified and using an identity of the content provider (resolved from the first operand) or a rating system associated with a ratings vendor, the operator is overloaded with software functions associated with a content operator. The content operator can perform comparisons of the original logic expression's operator against the types of data expected by the first and second operands. In one embodiment, at 131, the overloaded operator is acquired from an API library using either an identity for the content provider, a category for the desired content, or a rating system associated with a ratings vendor. One of these pieces of information or combinations of the same provide sufficient information to index into and acquire the proper overloaded operator for the original operator used in the logic expression from the API library.

At 140, after the logic expression has been resolved and expanded as necessary, the logic expression is evaluated using the overloaded operator. The evaluation returns a true or false value, which drives the remaining pieces of the logic expression that include one or more alternative actions. Actions can be any custom written or commercially available feature, service, or function that a developer includes based on receiving a true or false from evaluating the logic expression. For example, an action may be to permit access to the content and deliver the content to the requesting resource. Another action may be to initiate a logging procedure and/or notification procedure and to deny access to the content. Actions may also include specific identification credentials from the requesting resource, such as a biometric scan, certificate, or other identifying information. Any number of configurable actions can be processed based on true or false evaluations of the logic expression.

In some embodiments, at 141, the content operator can be used to perform additional operations on the first operand before a compare takes place against the second operator. Thus, the content operator may log a specific content rating for purposes of establishing trends or for purposes of establishing a running sum of previous content ratings that were consumed by a resource. The content ratings themselves may be weighted values, such that individual weightings may be summed and compared against pre-defined thresholds, etc. Specific content ratings may be averaged with other previous ratings, or compared against a standard deviation or other threshold value. Moreover, content operators may record ratings for purposes of establishing a history of content consumption and a running total for values of ratings associated with that consumed content. Actions may take advantage of trends, history, and the like for purposes of better monitoring, filtering, or controlling content consumption.

In some embodiments, at 150, a check is made to determine if more logic expressions are available for processing. If so, then processing resumes at 110 for the new logic expression. If not, then processing ends at 160. A group of logic statements can cooperate or associate with one another to form a content filtering service or application. Alternatively, a group of logic statements can cooperate or associated with one another to form a policy for a resource, a category associated with specific content, and the like.

Figure 2:
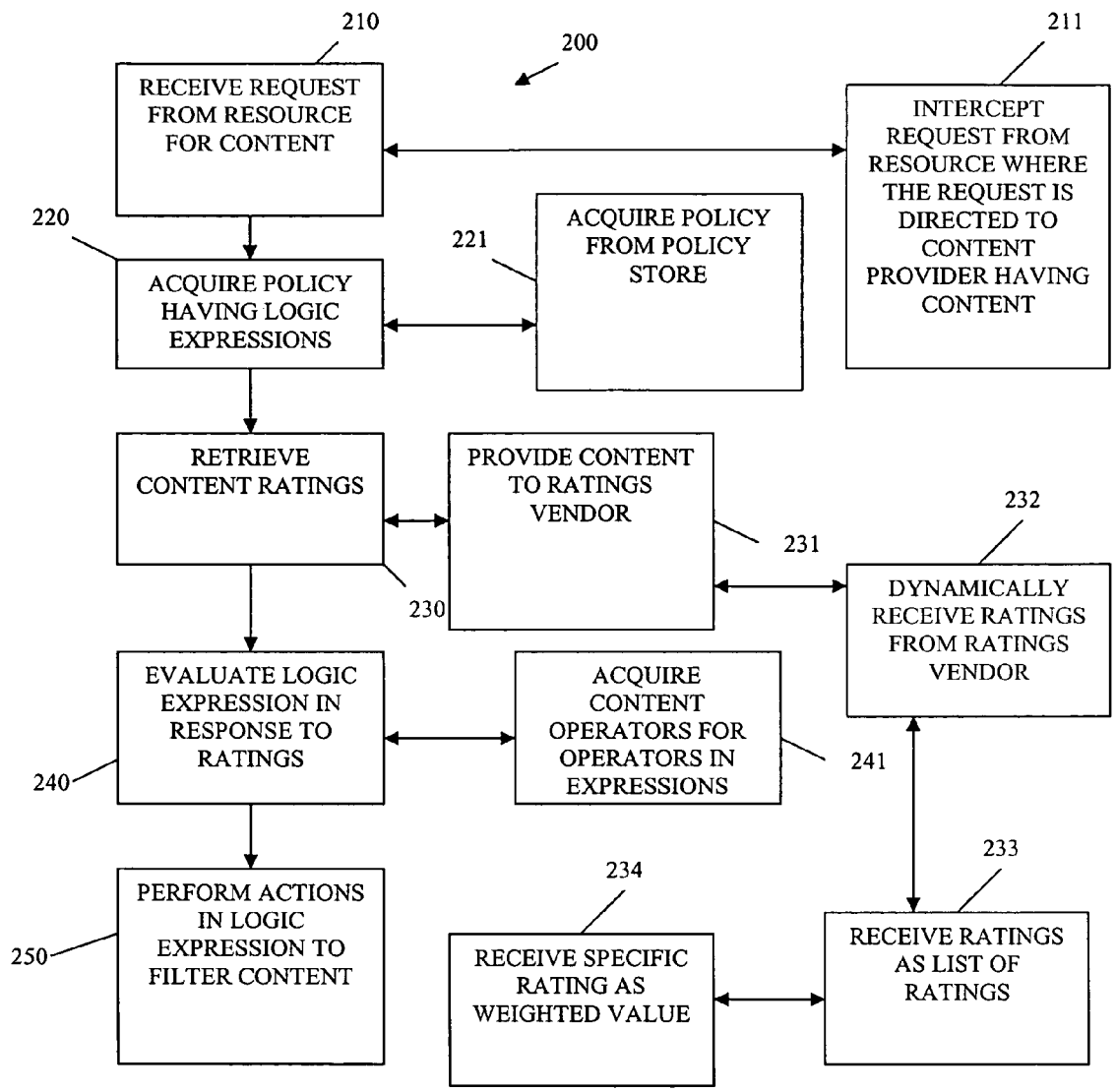
FIG. 2 is a flowchart of another method for content filtering, according to an example embodiment of the invention.

FIG. 2 is a flowchart of another method 200 for content filtering. The method 200 is implemented in a machine-accessible and readable medium and is accessible and processed over a network. The method (herein after "processing") may be implemented on any node of a network and perform content filtering on behalf of other nodes of the network. A node is a processing device, such as a client or a server. The designation of a client or a server is relative, such that depending upon the transaction being performed a client may be designated a server and vice versa.

At 210, a request is received from a resource for content. That request may be forwarded from the resource to the processing or may be intercepted, at 211, by other services (e.g., transparent proxy) and sent to the processing. The request is initially directed to a content provider that distributes or vends the content desired by the resource. In one embodiment, the request is represented as a URL or URI and the resource is a browser associated with a specific end-user.

At 220, a policy is acquired for the request. The policy includes one or more logic expressions and the format and syntax of the logic expression is similar to what was presented above with respect to method 100 of FIG. 1. The policy can be acquired based on a variety of information. For example, in one embodiment, the policy is acquired based on an identity for the requesting resource. In another embodiment, the policy is acquired based on a category associated with the desired content or an identity associated with the content provider that vends the desired content. Further, in some embodiments, the policy is acquired from a policy store, which is optionally managed by a policy manager.

Next, at 230, ratings for the desired content of the request are retrieved. The ratings may also be retrieved in a variety of manners. In some instances, the ratings may be cached and immediately retrieved from the cache. In other embodiments, at 231, the ratings may be retrieved by providing the desired content to a ratings vendor, in instances where the ratings vendor has not yet provided ratings for the content. In still other embodiments, the ratings vendor may have ratings for content associated with the content vendor, such that at 232, when the ratings vendor is contacted by the processing the rating(s) for the desired content is returned or essentially retrieved by the processing.

In some embodiments, at 233, the ratings are returned or retrieved as a list of ratings associated with the desired content and other content of a content provider. In these instances, a specific rating for the desired content can be acquired by searching the list for an identifier of the desired content. The list may be useful for subsequent requests for other content that may not have yet been requested by the resource or other resources interfacing to the processing. Maintaining the list in cache or local storage permits the processing to more rapidly evaluate future logic expressions which may utilize ratings for other content identified in the list.

In one embodiment, at 234, specific ratings in the list of ratings may be represented as weighted values. These weighted values can be summed, retained, or used in aggregate to perform operations and the operations can be evaluated for purposes of selecting the appropriate actions to take in a given situation. For example, the overloaded content operator may be designed to maintain histories or running totals of content consumed by one or more resources. These histories and running totals can be compared during any particular evaluation for purposes of establishing rating averages, rating standard deviations, rating trends, and the like. Thus, the weighted values of some ratings can be used for a variety of other purposes, and in some instances the overloaded operator may serve as a module that facilitates those other uses.

In some embodiments, the ratings may be retrieved by the processing by interacting with a combination of ratings vendors and other services that dynamically evaluate the desired content for information that may help categorize it. For example, a service may examine the content for certain frequency of pre-defined terms or phrases and based on this provide a category for the content. The category may then be provided to the ratings vendor to receive a rating. Other scenarios are possible as well and in some instances the content provider may provide services that are useful in resolving and retrieving the ratings for the desired content.

The logic expressions of the policies are now in condition to be evaluated, at 240. The evaluation returns a true or false value and permits other aspects of the logic expression to be processed. During evaluation, at 240, the operator of the logic expression is overloaded. That is, at 241, content operators are acquired for operators of the logic expressions in manners similar to what was discussed above with the method 100 of FIG. 1. The proper content operators that provide the desired software functions are resolved based on identities of the content providers, categories for the desired content, and/or rating systems for specific ratings vendors. Content operators can include software functions for performing numeric, set, table, database, tree, list, queue, string, and other data structure operations.

At 250, after the content operators are used to evaluate the first operand vis-à-vis the second operand of each logic expression, one or more appropriate actions are performed. The actions filter the content in a sense that they take some action or no action on the initial request for the desired content. Actions are configured, written, and referenced within the logic expressions.

Figure 3:
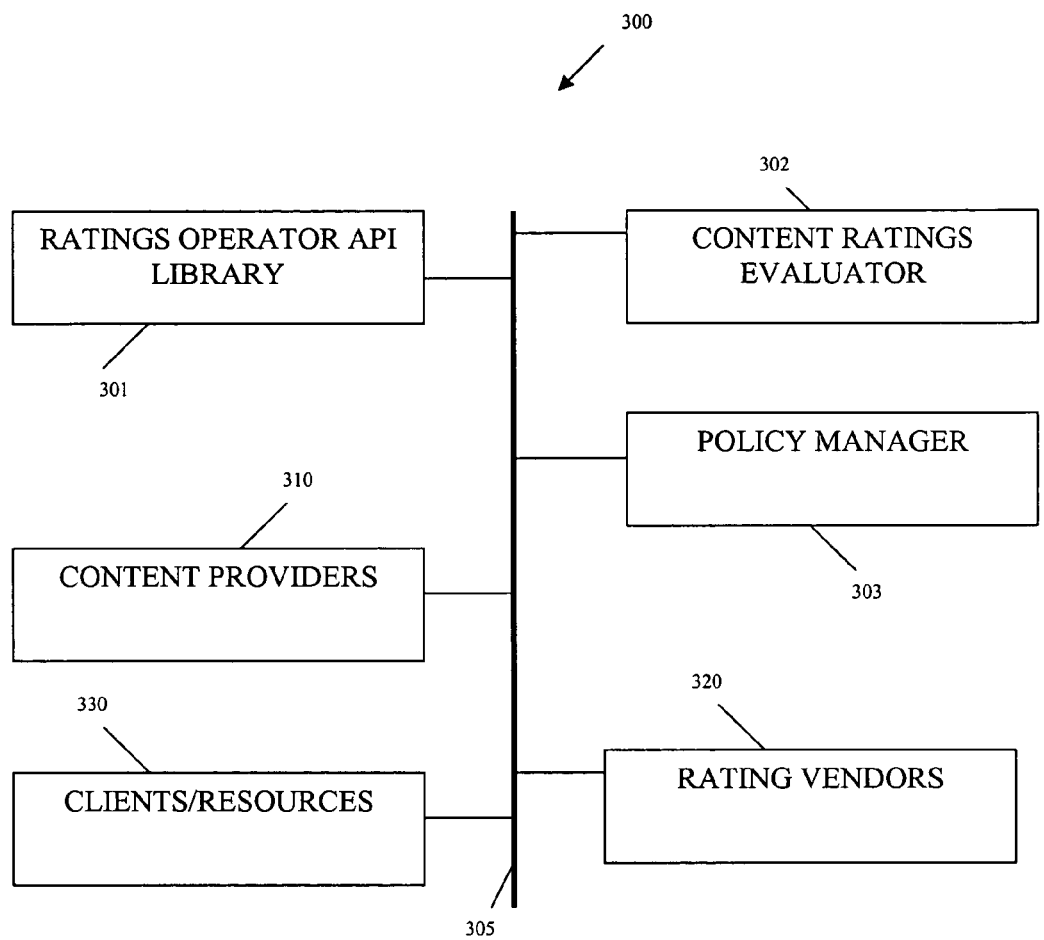
FIG. 3 is a diagram of a content filtering system, according to an example embodiment of the invention.

FIG. 3 illustrates a content filtering system 300. The content filtering system 300 is implemented in a machine-accessible and readable medium and is accessible and processed over a network. In one embodiment, the content filtering system 300 implements the methods 100 and 200 of FIGS. 1 and 2. The content filtering system 300 provides techniques for content filtering in generic and novel manners through evaluating logic expressions that include content ratings for content.

The content filtering system 300 includes a ratings operator API library 301, a content ratings evaluator 302, and, optionally, a policy manger 303. The ratings operator API library 301 includes a set of operators defined for a variety of traditional operators (e.g., numeric, string, set, etc.). Each set of operators is designed to perform the traditional comparisons for data types that are defined and enumerated by ratings and ratings systems for content providers 310, ratings vendors 320, and/or categories associated with content. Accordingly, the ratings operator API library 301 includes content operators that are overloaded in manners described above with respect to methods 100 and 200 of FIGS. 1 and 2.

The content ratings evaluator 302 evaluates logic expressions initiated by requests for content from clients or resources 330 over a network 305. In one embodiment, the content ratings evaluator 302 includes the logic expressions or acquires them as needed from files, storage, directories, or memory and represents a content filtering service for the clients or resources 330. In another embodiment, the content ratings evaluator 302 receives the logic expressions as policy statements from a policy manager 303. The policy statements are determined by the policy manager 303 based on identities for the resources 330 or based on categories for the desired content being requested by the resources 330.

The logic expressions include a first operand, an operator, and a second operand. The first operand is dynamically resolved by the content ratings evaluator 302 as a rating or list of ratings for a desired content which is requested by a resource 330. The second operand is dynamically resolved or is a constant string coded within the logic expression and it is compared to the first operand via the features of the operator. The content ratings evaluator 302 acquires an overloaded operator identified as a content operator for each evaluated logic expression based on an identity for a ratings vendor or an identity for a content provider that vends the desired content. The content operator is acquired from the ratings operator API library 301.

The content ratings evaluator 302 completes its evaluation of the logic expression by processing the one or more actions associated with a true evaluation or a false evaluation. True and false values are returned by the content operator upon execution of its software functions included in the ratings operator API library 301.

In one embodiment, the content ratings evaluator 302 processes within a proxy environment on behalf of the clients or resources 330. The process environment may be a forward proxy, a reverse proxy, or a transparent proxy. In some embodiments, the content ratings evaluator 302 uses caching services of the proxy environment to store, retrieve, and flush selective ratings and content that it manages and evaluates for its clients or resources 330.

Figure 4:
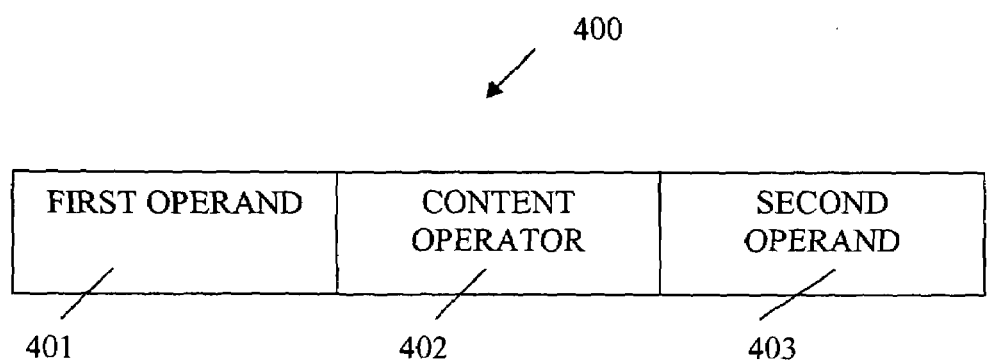
FIG. 4 is a diagram of a content filtering data structure, according to an example embodiment of the invention.

FIG. 4 is a diagram of a content filtering data structure 400. The content filtering data structure 400 is implemented in a machine-accessible and readable medium and forms a logic expression that is dynamically resolved and evaluated by the methods 100 and 200 of FIGS. 1 and 2 and the content ratings evaluator 302 of the content filtering system 300 of FIG. 3.

The content filtering data structure 400 includes a first operand 401, a content operator 402, and a second operand 402. The first operand 401 is resolved to be a content rating or list of ratings for content vended by a content provider. Resolution can be achieved in a variety of manners; for example, a resource may initially issue a request for content as a URL or URI, where the URL or URI identifies a ratings vendor that is dynamically contacted to provide the ratings for the content. Alternatively, the ratings may be pre-existing and located within cache. In still other embodiments, the ratings may be dynamically resolved by contacting the content provider associated with desired content. In yet other embodiments, the ratings may be dynamically acquired by evaluating the content for information that provides a resolution to the ratings.

The content operator 402 is an overloaded operator which is resolved based on an identity for a content provider of the desired content, a ratings system for a specific ratings vendor, or categories assigned to the desired content. This information permits the content operator 402 and its software functions to be located, loaded, and processed for purposes of evaluating the first operand 401 against the second operand 403. The resulting evaluation returns a true for success and a false for failure. And additional action statements may then be processed based on a true or false value. In one embodiment, the content operator 402 is acquired from the ratings operator API library 301 discussed above with the content filtering system 300 of FIG. 3.

The second operand 403 can also be dynamically resolved in manners that were discussed above with respect to the first operand 402. Additionally, in some instances values for the second operand 403 are hard coded as constant strings. In other instances, the second operand 403 is a nested instance of another content filtering data structure 400.

In one embodiment, multiple instances of the content filtering data structure 400 cooperate and are logically associated and grouped with one another to form a content filtering service or application. In other embodiments, multiple instances of the content filtering data structure 400 cooperate and are associated to form a policy for a resource. The policy may be housed in a policy store and/or managed by a policy manager, such as the policy manager 303 of the content filtering system 300 of FIG. 3.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for content filtering, comprising:
   identifying a first operand of a logic expression as a content rating associated with content of a content provider;
   identifying a second operand of the logic expression;
   dynamically replacing an operator of the logic expression to a overloaded content operator based on the content provider, wherein the overloaded content operator is acquired from a library; and
   evaluating the logic expression to perform one or more actions that filter the content based on values for the first operand and the second operand in response to applying the overloaded content operator.

2. The method of claim 1 further comprising, constructing the logic expression as a variable statement having the first operand, the second operand, and the operator, wherein the values and the content operator are dynamically resolved.

3. The method of claim 1 further comprising, processing the method for additional iterations with additional logic expressions, wherein the logic expression and the additional logic expressions cooperate to form an application or service for content filtering.

4. The method of claim 1, wherein overloading includes selecting the content operator from an Application Programming Interface (API) library, which is the library, in response to the content provider and the logic operator.

5. The method of claim 4 further comprising, identifying the content operator as a numeric operator, a string operator, a data structure operator, or a set operator.

6. The method of claim 1 further comprising, acquiring the logic expression based on a policy associated with a resource.

7. The method of claim 1 further comprising, acquiring the logic expression based on an identity associated with a resource.

8. The method of claim 1, wherein identifying the first operand includes identifying the first operand as an address or link for acquiring the content from the content provider.

9. The method of claim 1, wherein evaluating includes applying the content operator to compare a value for the content rating against at least one of a trend, a threshold, and a standard deviation.

10. A method for content filtering, comprising:
    receiving a request for content from a resource;
    acquiring a policy for the resource having one or more logic expressions;
    retrieving content ratings for a content provider associated with the content;
    evaluating the one or more logic expressions in response to the content ratings, wherein the one or more logic expressions include overloaded content operators that are dynamically replaced within the logic expressions from a library; and
    performing one or more actions included in the one or more logic expressions in response to the evaluation which filters the content.

11. The method of claim 10, wherein evaluating includes acquiring a content operator for each of the logic expressions based on operators of the logic expressions and the content provider.

12. The method of claim 10, wherein receiving includes intercepting the request from a client associated with the resource, wherein the request is direct to the content provider.

13. The method of claim 10, wherein acquiring includes obtaining the policy from a policy store in response to an identity associated with the resource.

14. The method of claim 10, wherein retrieving includes dynamically receiving the content ratings from a ratings vendor.

15. The method of claim 10, wherein retrieving includes dynamically acquiring the content from the content vendor and providing the content to a ratings vendor to dynamically receive the content ratings.

16. The method of claim 10, wherein retrieving includes receiving a list of ratings from a ratings vendor, wherein the list includes a specific rating for the content of the request and other ratings for additional content of the content vendor, and wherein the list is managed in cache.

17. The method of claim 16, wherein receiving the list of ratings includes receiving the specific rating as a weighted value, and wherein the weighted value is logged for other uses.

18. A content filtering system, comprising:
a ratings operator Application Programming Interface (API) library; and
a content ratings evaluator to evaluate logic expressions, wherein the logic expressions include a first operand associated with content ratings, a second operand, and an operator that compares the first operand to the second operand, and wherein the operator is overloaded and replaced dynamically by the content ratings evaluator by accessing the library in response to identities for content providers or identities for rating vendors associated with content being requested.

19. The content filtering system of claim 18, wherein the contents rating evaluator processes within a reverse, transparent, or forward proxy environment on a network on behalf of one or more clients, and wherein the content providers reside remotely from the one or more clients and the contents rating evaluator.

20. The content filtering system of claim 18 further comprising, a policy manager that distributes the logic expressions to the content ratings evaluator in response to identities for requesters of the content being requested.

21. The content filtering system of claim 18 further comprising, a policy manager that distributes the logic expressions to the content ratings evaluator in response to categories associated with the content being requested.

22. The content filtering system of claim 18, wherein the overloaded logic operators include at least one of numeric operators, string operators, data structure operators, and set operators.

23. The content filtering system of claim 18, wherein the content ratings evaluator is designed as an application or service for performing at least one of filtering the content being requested from specific content providers, filtering the content being requested from specific resources, and filtering the content being requested for specific categories associated with the content being requested.

24. A data structure, residing in a machine-readable medium, for evaluating logic expressions associated with content ratings, comprising:
a first operand representing one or more content ratings for content supplied by a content vendor;
a second operand representing one more values or variable expressions for which the first operand is compared; and
a content operator that includes logic for comparing the first operand to the second operand and returning a true or false value in response to the comparison, wherein the content operator is adapted to a dynamically overloaded operator and is selectively acquired from a library.

25. The data structure of claim 24, wherein values for the first operand are dynamically acquired from a ratings vendor.

26. The data structure of claim 24, wherein values for the first operand are dynamically resolved by evaluating content associated with content providers associated with the first operand.

27. The data structure of claim 24, wherein the first operand is a Uniform Resource Locator (URL) or Universal Resource Identifier (URI) for a service or resource.

28. The data structure of claim 24, wherein the second operand includes constant values.

29. The data structure of claim 24, wherein the content operator is at least one of a numeric operator, a string operator, a tree operator, a list operator, a database operator, a queue operator, a table operator, and a set operator.

30. The data structure of claim 24, wherein multiple instances of the data structure cooperate to form a content filtering application or service.

31. The data structure of claim 24, wherein multiple instances of the data structure cooperate to form a content filtering policy housed in a policy data store and associated with a resource.

* * * * *

UNITED STATES PATENT AND TRADEMARK OFFICE
CERTIFICATE OF CORRECTION

PATENT NO. : 7,043,555 B1
APPLICATION NO. : 10/880760
DATED : May 9, 2006
INVENTOR(S) : McClain et al.

It is certified that error appears in the above-identified patent and that said Letters Patent is hereby corrected as shown below:

In column 10, line 3, in Claim 1, delete "a" and insert - - an - -, therefor.

In column 10, line 52, in Claim 10, after "evaluation" insert - - , - -.

In column 11, line 35, in Claim 20, delete "requesters" and insert - - requestors - -, therefor.

In column 12, lines 6-8, in Claim 24, delete "A data structure, residing in a machine-readable medium, for evaluating logic expressions associated with content ratings, comprising:" and insert - - A medium having instructions, the instruction when accessed by a machine perform a method within the machine, the instructions comprising: - -, therefor.

In column 12, line 11, in Claim 24, delete "one" and insert - - one or - -, therefor.

In column 12, line 12, in Claim 24, delete "for" and insert - - with - -, therefor.

In column 12, line 14, in Claim 24, delete "includes logic for comparing" and insert - - compares - -, therefor.

In column 12, lines 15-16, in Claim 24, delete "returning a true or false value" and insert - - that returns a result - -, therefor.

In column 12, line 17, in Claim 24, after "to" delete "a".

In column 12, lines 17-18, in Claim 24, delete "overloaded" and insert - - overload an - -, therefor.

In column 12, line 20, in Claim 25, delete "data structure" and insert - - medium - -, therefor.

In column 12, line 23, in Claim 26, delete "data structure" and insert - - medium - -, therefor.

In column 12, line 28, in Claim 27, delete "data structure" and insert - - medium - -, therefor.

In column 12, line 31, in Claim 28, delete "data structure" and insert - - medium - -, therefor.

UNITED STATES PATENT AND TRADEMARK OFFICE
CERTIFICATE OF CORRECTION

PATENT NO. : 7,043,555 B1
APPLICATION NO. : 10/880760
DATED : May 9, 2006
INVENTOR(S) : McClain et al.

It is certified that error appears in the above-identified patent and that said Letters Patent is hereby corrected as shown below:

In column 12, line 33, in Claim 29, delete "data structure" and insert - - medium - -, therefor.

In column 12, line 37, in Claim 30, delete "data structure" and insert - - medium - -, therefor.

In column 12, line 38, in Claim 30, delete "data structure" and insert - - instructions - -, therefor.

In column 12, line 40, in Claim 31, delete "data structure" and insert - - medium - -, therefor.

In Column 12, line 41, in Claim 31, delete "data structure" and insert - - instructions - -, therefor.

Signed and Sealed this

Fifteenth Day of August, 2006

JON W. DUDAS
*Director of the United States Patent and Trademark Office*